United States Patent [19]

Kimura et al.

[11] Patent Number: 4,571,069

[45] Date of Patent: Feb. 18, 1986

[54] RECORDING APPARATUS

[75] Inventors: Shigeki Kimura; Yoshihisa Ikuta; Yoshihiro Nakajima, all of Osaka, Japan

[73] Assignee: Mita Industrial Company Limited, Japan

[21] Appl. No.: 744,300

[22] Filed: Jun. 13, 1985

Related U.S. Application Data

[63] Continuation of Ser. No. 467,192, Feb. 16, 1983, abandoned.

[30] Foreign Application Priority Data

Feb. 26, 1982 [JP] Japan .................................. 57-30879

[51] Int. Cl.$^4$ ............................................ G03G 15/00
[52] U.S. Cl. ................................ 355/14 R; 355/14 C; 346/154
[58] Field of Search ..................... 346/150, 154, 160; 355/14 C, 14 SH, 14 R; 358/296, 300

[56] References Cited

U.S. PATENT DOCUMENTS 4,130,354 12/1978 Steiner .......................... 355/14 C X
4,175,851 11/1979 Kitamura et al. .
4,206,996 6/1980 Clark et al. ........................ 355/14 C
4,421,404 12/1983 Conly ........................... 355/14 SH X Primary Examiner—Ulysses Weldon
Attorney, Agent, or Firm—Lerner, David, Littenberg, Krumholz & Mentlik

[57] ABSTRACT

A recording apparatus has a printer mechanism for printing images successively on sheets of copying paper, and an image control circuit for delivering image information controllably to the printer mechanism so as to enable the latter to print the images successively. The image control circuit includes a plurality of page memories each for storing image information per single page, a first changeover switch for writing image information selectively into the page memories, and a second changeover switch for reading image information selectively from the page memories. When a sheet of copying paper is jammed in the printer mechanism, a microcomputer system controls the second changeover switch to select a switching mode to read an item of image information out of one of the page memories which stores the item of information to be printed on the jammed sheet of copying paper, for thereby allowing the image to be printed in a shorter period of time after paper jam clearance.

8 Claims, 2 Drawing Figures

RECORDING APPARATUS

This is a continuation of application Ser. No. 467,192 filed Feb. 16, 1983, now abandoned.

BACKGROUND OF THE INVENTION

1. Field of the Invention

The present invention relates to a recording apparatus, and more particularly to a recording apparatus for supplying image information through an image control circuit to a photosensitive member to record the image thereon and for printing the image on a sheet of copying paper being fed along.

2. Description of the Prior Art

In recording apparatus of the type described, it has been customary to store image information fed from a central control unit into a single page memory within an image control circuit, and to supply the image information per page to a photosensitive member to print the image on a sheet of copying paper, and to then store a next supply of image information in the page memory after the previous image information per page has been read out of the page memory. When the sheet of copying paper on which the image has been printed gets jammed somewhere in a paper feed path, it is necessary to get rid of the jammed paper and transfer a new set of image information from the central control unit to the page memory before the image is printed again. Since the image information is transferred from the central control unit to the page memory in a serial mode, it takes a relatively long time to print the image on the copying paper again after the paper jam has been cleared.

Therefore, it is an object of the present invention to provide a recording apparatus which is capable of printing image information on a next sheet of copying paper in a reduced period of time after the jammed sheet has been removed.

SUMMARY OF THE INVENTION

To accomplish the foregoing object, there is provided a recording apparatus which comprises a printer mechanism for printing images successively on sheets of copying paper, and an image control circuit for delivering image information controllably to the printer mechanism to enable the latter to print the images successively. The image control circuit includes a plurality of page memories each for storing image information per single page, a first changeover switch for writing image information selectively into the page memories, and a second changeover switch for reading image information selectively from the page memories. When a sheet of copying paper is jammed in the printer mechanism, a microcomputer system controls the second changeover switch to select a switching mode to read an item of image information out of one of the page memories which stores the item of information to be printed on the jammed sheet of copying paper, for thereby allowing the image to be printed in a shorter period of time after paper jam clearance.

DETAILED DESCRIPTION OF THE PREFERRED EMBODIMENT

Figure 1:
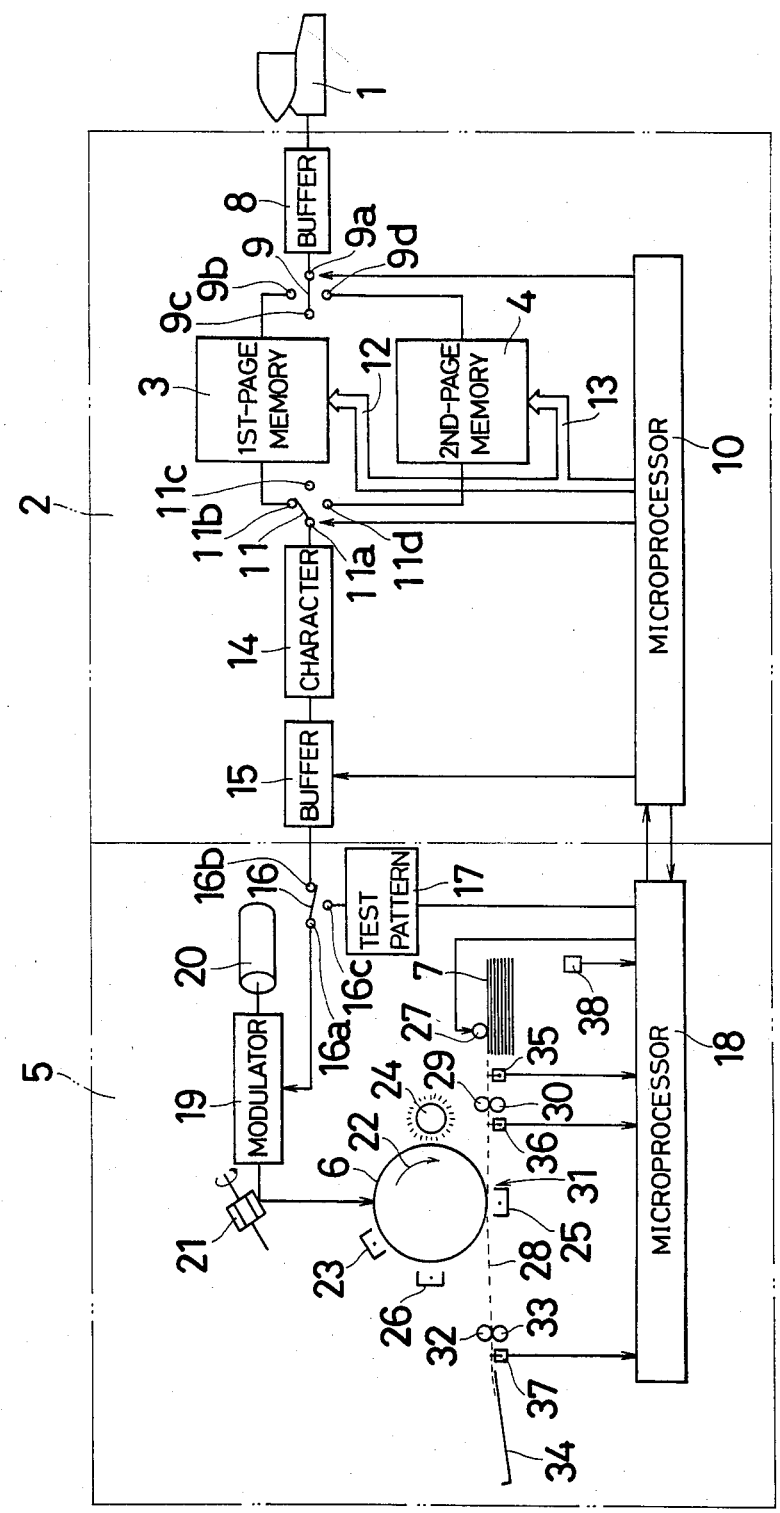
FIG. 1 is a block diagram of a recording apparatus according to the present invention.

As shown in FIG. 1, a recording apparatus includes a computer 1 serving as central control unit in which image information is stored. Image information per page or sheet of copying paper is successively supplied from the computer 1 to an image control circuit 2. The image control circuit 2 is composed of a plurality of, for example, a pair of first- and second-page memories 3 and 4 into which the image information per page is successively stored. The image information is then successively read out of the first- and second-page memories 3 and 4 and supplied to a printer mechanism 5. The printer mechanism 5 includes a photosensitive member 6 which is irradiated with a laser beam in response to the image information fed from the image control circuit 2. The image thus formed on the photosensitive member 6 is then printed on or transferred onto a sheet of copying paper 7.

The image information from the computer 1 is delivered through a buffer 8 in the image control circuit 2 to a common contact 9a of a first changeover switch 9. The first changeover switch 9 has first, second and third separate contacts 9b, 9c, 9d. The first contact 9b is connected to the first-page memory 3. The second contact 9c is an idle terminal. The third contact 9d is connected to the second-page memory 4. The first changeover switch 9 is controlled by a first microprocessor 10 for a switching mode in which when image information is being written in one of the first- and second-page memories 3 and 4, the other memory 3 or 4 being in a standby condition, and for another switching mode in which no image information is written in either of the first- and second-page memories 3 and 4.

A second changeover switch 11 has a common contact 11a, and first, second and third separate contacts 11b, 11c, 11d. The first contact 11b is connected to the first-page memory 3. The second contact 11c is an idle terminal. The third contact 11d is connected to the second-page memory 4. The second changeover switch 11 is controlled by the first microprocessor 10 for a switching mode in which when image information is being read out of one of the first- and second-page memories 3 and 4, the other memory 3 or 4 being in a standby condition, and for another switching mode in which no image information is read out of either of the first- and second-page memories 3 and 4. The first- and second-page memories 3 and 4 are supplied with control signals from the first microprocessor 10 through system buses 12 and 13.

The common contact 11a of the second changeover switch 11 is connected through a character generator 14 and a buffer 15 to a contact 16b of a third changeover switch 16 in the printer mechanism 5.

The third changeover switch 16 has another contact 16c connected to a test pattern generator 17 which is coupled to a second microprocessor 18. The test pattern generator 17 supplies a test pattern signal to the contact 16c in response to a signal from the second microprocessor 18. The third changeover switch 16 has a common contact 16a joined to a modulator 19 to which a laser beam source 20 is connected. A laser beam as emitted by the laser beam source 20 and modulated by the modulator 19 in response to image information supplied is reflected by a rotating multisurface mirror 21 onto the photosensitive member 6. The photosensitive member 6 is composed of a rotatable drum having an outer circumferential surface coated with a photosensitive layer.

The photosensitive member 6 is rotatable in the direction of the arrow 22 about its own axis, and is surrounded by a corona discharger 23 for charging the photosensitive member 6, a magnetic brush developing unit 24, a corona discharger 25 for transferring an image, and a charge remover 26, in the order placed along the direction of the arrow 22. A sheet of copying paper 7 is fed by a paper feed roller 27 along a feed path 28 indicated by the broken line. A pair of transfer rollers 29 and 30 are disposed downstream of the paper feed roller 27 with respect to the direction of feed along the paper feed path 28 for feeding the sheet of copying paper 7 into an image transfer region 31 in which the sheet of copying paper 7 is brought into contact with the photosensitive member 6. The sheet of copying paper 7 is then discharged by a pair of fixation rollers 32 and 33 onto a tray 34.

After the photosensitive member 6 has been charged by the corona discharger 23, the photosensitive member 6 is irradiated with a laser beam to form an electrostatic latent image thereon, which is then visualized by the magnetic brush developing unit 24. In the image transfer region 31, the visualized image is transferred from the photosensitive member 6 onto the sheet of copying paper 7, and the transferred image is fixed to the sheet of copying paper 7 by the fixation rollers 32 and 33. The sheet of copying paper 7 on which the image information has been printed is discharged onto the tray 34. The paper feed roller 27 is controlled by a control signal issued from the second microprocessor 18 for feeding a sheet of copying paper 7 in synchronism with the image formation on the photosensitive member 6.

A first detector 35 is located upstream of the transfer rollers 29 and 30 with respect to the direction of feed along the paper feed path 28, and a second detector 36 is disposed downstream of the transfer rollers 29 and 30. A third detector 37 is positioned downstream of the fixation rollers 32 and 33. The detectors 35, 36 and 37 serve to detect sheets of copying paper for determining whether any sheet of copying paper has jammed in the paper feed path 28. More specifically, when a sheet of copying paper 7 is not detected by the first detector 35 upon the elapsing of a first preset period of time after the feed roller 27 has started feeding the sheet of copying paper 7, it is determined that a paper jam has occurred somewhere between the feed roller 27 and the first detector 35. The failure of the second detector 36 to detect any sheet of copying paper 7 upon the elapsing of a second preset time interval after a sheet of copying paper 7 has been detected by the first detector 35 indicates that the sheet of copying paper 7 has been caught somewhere between the first and second detectors 35 and 36. Likewise, any paper jam between the second and third detectors 36 and 37 can be detected when the third detector 37 fails to detect a sheet of copying paper 7 upon the elapsing of a third preset period of time after the sheet of copying paper 7 has passed through the second detector 36. Detection signals from the first, second and third detectors 35, 36 and 37 are supplied to the second microprocessor 18 to enable the latter to determine the occurrence of a paper jam.

The image formation on the photosensitive member 6 is effected in a timed relationship with respect to the travel of a sheet of copying paper 7 such that any image will have just been formed on the photosensitive member 6 when the trailing edge of a sheet of copying paper 7 has moved past the second detector 36. The printer mechanism 5 has a paper jam clearance button 38 for resetting the printer mechanism 5 after any paper jam has been cleared. A reset signal issued from the paper jam clearance button 38 is fed to the second microprocessor 18.

Figure 2:
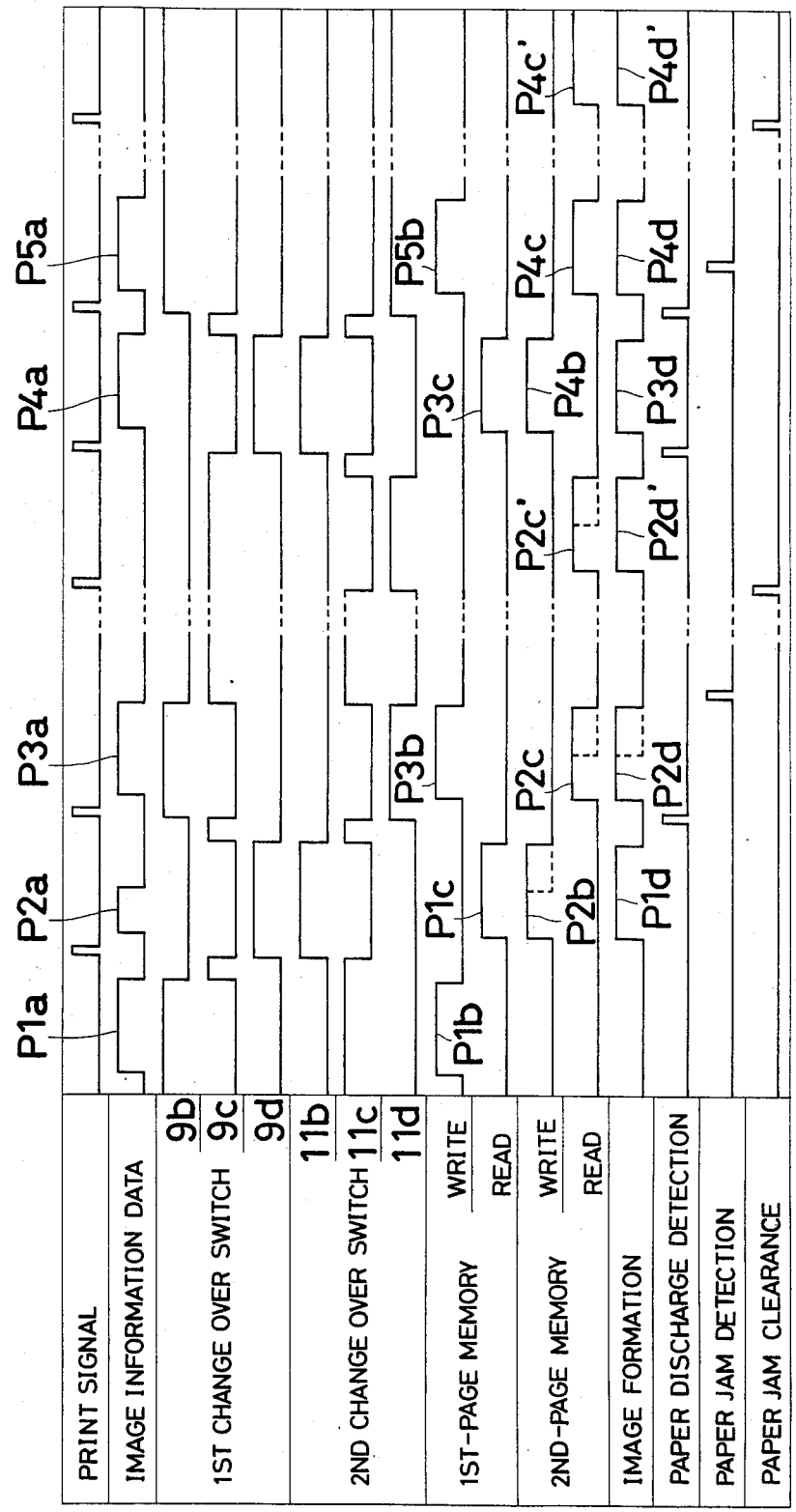
FIG. 2 is a timing chart illustrating the steps of operation of the recording apparatus of FIG. 1.

Operation of the recording apparatus thus constructed will be described with reference to FIG. 2. In FIG. 2, the contacts 9b to 9d and 11b to 11d of the first and second changeover switches 9 and 11 produce signals of a logic high level when they are connected to the common contacts 9a, 11a, respectively. The characters P1, P2, P3, P4 are indicative of image information for pages 1, 2, 3, 4, respectively, a suffix "a" of data transferred from the computer 1 to the image control circuit 2, a suffix "b" of data written, a suffix "c" of data read out, and a suffix "d" of data formed as an image.

For printing image information for the first page, the common contact 9a of the first changeover switch 9 is connected to the contact 9b to allow image information data P1b to be written into the first-page memory 3 in response to image information data P1a transferred from the computer 1. After the image information data has been written in the first-page memory 3, the common contact 9a of the first changeover switch 9 is connected to the contact 9c. In response to the issuance of a print signal, the common contact 9a of the first changeover switch 9 is connected to the contact 9d, and the common contact 11a of the second changeover switch 11 is connected to the contact 11b. Image information data P1c for the first page is then read out of the first-page memory 3, and an image based on image information P1d is formed on the photosensitive member 6. The image information for the first page is now printed on a sheet of copying paper 7. Image information P2b is written into the second-page memory 4 in response to image information P2a for the second page which is transferred from the computer 1. Where the second-page image information P2a is relatively small, the substantial period of time it takes for the image information P2b to be written is small as indicated by the broken line. When the trailing edge of the sheet of copying paper 7 has moved past the third detector 37, a paper discharge signal is generated, and a print signal for the second page is produced in response to such a paper discharge signal.

In response to the print signal for the second page, the common contact 9a of the first changeover switch 9 is connected to the contact 9b again, and the common contact 11a of the second changeover switch 11 is connected to the contact 11d. Image information P3b for the third page is written into the first-page memory 3, and the image information P2c for the second page is read out of the second-page memory 4 to form an image on the photosensitive member 6 in response to image information P2d. Successive pieces of image information are written into and read out of the first- and second-page memories 3 and 4, and printed on sheets of copying paper 7 in the foregoing manner.

It is now assumed that a sheet of copying paper 7 is jammed after the image has been formed in response to the second-page image information P2d, that has, a paper jam is occurred in the feed path 28 between the second and third detectors 36 and 37. When the paper jam takes place, no paper discharge signal is generated, and image information for the fourth page is not transferred from the computer 1. The common contacts 9a, 11a of the first and second changeover switchs 9 and 11 are connected to the contacts 9c and 11c, respectively.

When the paper jam clearance button 38 is depressed after the jammed paper has been removed, a print signal is produced. At this time, the common contact 9a of the first changeoever switch 9 remains connected to the contact 9c, but the common contact 11a of the second changeover switch 11 is connected to the contact 11d again. No image information for the fourth page is transferred from the computer 1. Image information P2c' for the second page is read out of the second-page memory 4 to form an image based on the image information P2d.

When the sheet of copying paper 7 for the second page is discharged into the tray 34, a paper discharge signal and hence a corresponding print signal are generated, whereupon the common contact 9a is connected to the contact 9d and the common contact 11a is connected to the contact 11b. Image information P4a for the fourth page is transferred from the computer 1 to permit image information P4b to be stored in the second-page memory 4. Image information P3c for the third page is read out of the first-page memory 3 to cause an image to be formed on the photosensitive member 6 based on image information P3d dependent on the image information P3c.

Upon discharge of a sheet of copying paper 7 for the third page, a print signal is issued in response to a paper discharge signal, and the common contacts 9a and 11a are connected to the contacts 9b and 11d, respectively. Image information P5a for the fifth page transferred from the computer 1 is written as image information P5b into the first-page memory 3, and image information P4c for the fourth page is read out of the second-page memory 4 to form an image on the photosensitive member 6 based on image information P4d.

When a sheet of copying paper 7 is jammed while the image for the fourth page is being formed, that is, before the trailing edge of the sheet of copying paper 7 moves past the second detector 36, the first and second changeover switches 9 and 11 remain unchanged in their switching modes regardless of the generation of a paper jam signal. A print signal is produced in response to depression of the paper jam clearance button 38. With the first and second changeover switches 9 and 11 in the same switching modes, image information P4c' is read out of the second-page memory 4 to form an image based on image information P4d'. Since the image information P5a for the fifth page has already been stored as the image information P5b in the first-page memory 3, no image information is transferred from the computer 1.

To detect a malfunction of the printer mechanism 5, the third changeover switch 16 is shifted to connect the common contact 16a to the contact 16c. Test pattern information is then supplied from the second microprocessor 18 through the test pattern generator 17 to form an image on the photosensitive member 6 in response to the test pattern information and transfer such a test pattern image onto a sheet of copying paper 7. The operator now checks the printed test pattern image on the sheet of copying paper 7 to see if the printer mechanism 5 is operating normally.

While in the illustrated embodiment only two page memories are employed, three or more page memories may be incorporated in the recording apparatus.

With the arrangement of the present invention, the recording apparatus has a plurality of page memories which are alternately selected by first and second changeover switches for writing and reading successive items of image information. After a paper jam has been cleared, one of the page memories which contains image information to be printed on a sheet of copying paper that was jammed delivers the same image information. This allows the image to be printed in a shorter period of time after paper jam clearance. Furthermore, a computer program can be simplified which controls delivery of image information to the image control circuit.

Although a certain preferred embodiment has been shown and described, it should be understood that many changes and modifications may be made therein without departing from the scope of the appended claims.

What is claimed is:

1. Image recording apparatus comprising:

printer means for printing pages of image information successively onto sheets of copy paper, each page of image information being printed upon a separate sheet of copy paper; and an image control circuit for receiving successive pages of image information to be printed and for delivering pages of image information controllably to said printer means to enable said printer means to print each page of image information upon a separate sheet of copy paper, said image control circuit including:

a plurality of page memory means, each of said plurality of page memory means for storing one page of image information to be printed upon a separate sheet of copy paper, first changeover switch means for writing each page of image information selectively into said plurality of page memory means, second changeover switch means for selectively reading each page of image information from said plurality of page memory means, and means for controlling said first and second changeover switch means to normally cause succeeding pages of image information to be written into alternate ones of said plurality of page memory means and to normally cause said second changeover switch means to selectively read a page of image information from one of said plurality of page memory means while said first changeover switch means is selectively writing a page of image information into another of said plurality of page memory means, said means for controlling being responsive to a paper jam occurrence in said printer means for placing said second changeover switch means in a condition to read a page of image information from the previously read page memory means which contains image information for the page associated with said paper jam occurrence.

2. The apparatus according to claim 1 wherein said printer means includes a paper feed path for feeding sheets of copy paper toward a printing location to receive a page of image information thereon and toward a holding location after printing of page information thereon has occurred, a plurality of detector means disposed along said paper feed path for detecting paper jam conditions in said paper feed path, and means for monitoring each of said plurality of detector means to determine if a paper jam condition is present.

3. The apparatus according to claim 2 wherein said means for controlling is connected to said means for monitoring and is responsive to a determination that a paper jam condition is present to place said second changeover switch means in a condition to read a page of information from said previously read page memory means containing image information for the page associated with said paper jam occurrence.

4. The apparatus according to claim 1 additionally comprising test pattern generator means and third changeover switch means for selectively applying image information to said printer means, said third changeover switch means having first and second positions and active in a first position to apply each page of image information read by said second changeover switch means to said printer means and active in a second position to apply image information representing a test pattern from said test pattern generator means to said printer means.

5. The apparatus according to claim 2 wherein said means for monitoring and said means for controlling take the form of microprocessor means.

6. The apparatus according to claim 4 additionally comprising character generator means and buffer means interposed between said second and third changeover switch means.

7. The apparatus according to any of claims 2, 3 or 5 wherein at least one of said plurality of detector means is disposed prior to said printing location and another of said plurality of detector means is disposed between said printing location and said holding location.

8. The apparatus according to claim 3 additionally comprising test pattern generator means and third changeover switch means for selectively applying image information to said printer means, said third changeover switching means having first and second positions and active in a first position to apply each page of image information read by said second changeover switch means to said printer means and active in a second position to apply image information representing a test pattern from said test pattern generator means to said printer means.

* * * * *